(12) United States Patent
Cheng (10) Patent No.: US 8,935,445 B2
(45) Date of Patent: Jan. 13, 2015

(54) MULTI-COMPUTERS NETWORK SHARING SYSTEM HAVING PLUG-AND-PLAY INTERFACES

(75) Inventor: Ching-Wei Cheng, Keelung (TW)

(73) Assignee: Action Star Enterprise Co., Ltd. (TW)

( * ) Notice: Subject to any disclaimer, the term of this patent is extended or adjusted under 35 U.S.C. 154(b) by 335 days.

(21) Appl. No.: 13/547,175

(22) Filed: Jul. 12, 2012

(65) Prior Publication Data

US 2013/0318261 A1 Nov. 28, 2013

(30) Foreign Application Priority Data

May 23, 2012 (TW) .............................. 101118386 A (51) Int. Cl.
*G06F 13/12* (2006.01)
(52) U.S. Cl.
USPC .......................................................... 710/62
(58) Field of Classification Search
None
See application file for complete search history.

(56) References Cited

U.S. PATENT DOCUMENTS 8,332,523 B2 * 12/2012 Weinstock et al. ........... 709/229

\* cited by examiner

*Primary Examiner* — Henry Tsai
*Assistant Examiner* — Juanito Borromeo (57) ABSTRACT

The present invention relates to a multi-computers network sharing system having plug-and-play interfaces, comprising: an ethernet physical unit, a media accessing and controlling unit, a flow control unit, a plug-and-play interface transforming module, and a plurality of plug-and-play interfaces. In the multi-computers network sharing system of the present invention, when one of the external electronic devices is connected to any one of the plug-and-play interfaces, the flow control unit transmits the ethernet signal accessed by the first media accessing and controlling unit to the plug-and-play interface transforming module, therefore the plug-and-play interface transforming module transforms the ethernet signal to a plug-and-play interface signal and next transmits the plug-and-play interface signal to the electronic device connected with the plug-and-play interface, such that the electronic device can connect to the Internet without using any network cables or wi-fi devices.

14 Claims, 8 Drawing Sheets

MULTI-COMPUTERS NETWORK SHARING SYSTEM HAVING PLUG-AND-PLAY INTERFACES

BACKGROUND OF THE INVENTION

1. Technical Field

The present invention relates to a network communication system, and more particularly, to a multi-computers network sharing system having plug-and-play interfaces.

2. Description of Related Art

Ethernet interfaces are widely used in network communication system, PC and notebook for facilitating those devices capable of connecting to an ethernet network, i.e., the Internet. However, for a specific network communication system, it needs to further include some USB interfaces besides the ethernet interface, so that the external electronic devices, such as network communication system notebook, can be connected to the network communication system via the USB interface or the ethernet interface.

Figure 1:
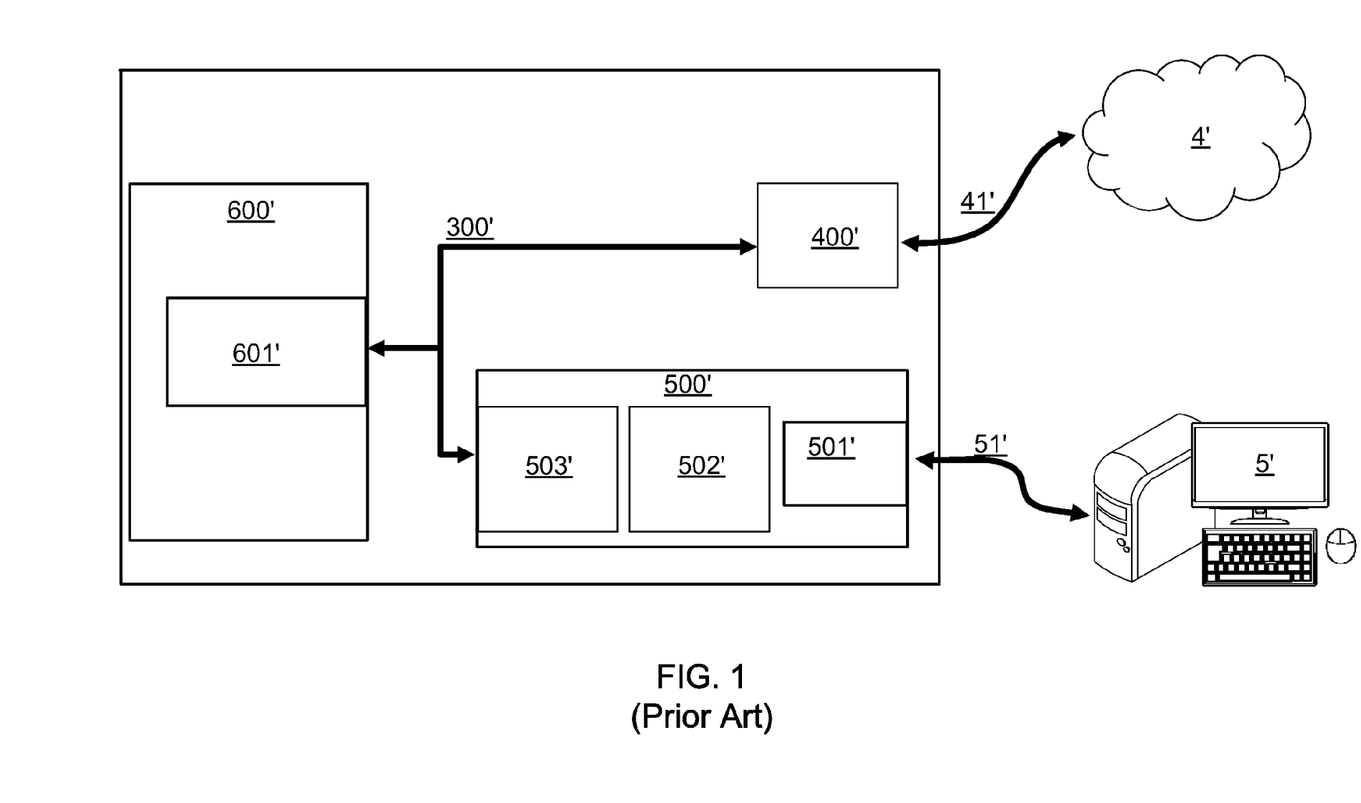
FIG. 1 is a framework view of a network communication system with an ethernet interface and an USB interface.

Accordingly, network communication system manufactures propose a network communication system with an ethernet interface and an USB interface. Please refer to FIG. 1, which illustrates a framework view of a network communication system with an ethernet interface and an USB interface. As shown in FIG. 1, the network communication system includes: a network micro-controlee 600', an USB-to-Ethernet controller 500' and an ethernet physical layer 400', wherein the network micro-controlee 600', the USB-to-Ethernet controller 500', the an ethernet physical layer 400' communicate to each other through a media independent interface (MII) 300'.

In the aforesaid network communication system, the network micro-controlee 600' has a media access controller (MAC) 601', used for access an ethernet network 4' via the ethernet physical layer 400'; Similarly, the USB-to-Ethernet controller 500' also includes a media access controller (MAC) 503' for controlling the ethernet physical layer 400', so as to access the ethernet network 4' via a network cable 41'. Therefore, through an USB-to-Ethernet bridge 502' and an USB physical layer 501' of the USB-to-Ethernet controller 500', an external electronic device 5' can connects to the ethernet network 4' (i.e., the Internet) via an USB cable 51'.

The aforesaid network communication system with ethernet interface and USB interface provides the electronic device to connect to the ethernet network through the USB interface, that make the connection way between the electronic device and the network communication system become convenient. However, the network communication system can merely provide only one electronic device to connect to the ethernet network through the USB interface; in fact, that is not a smart framework and causes user's inconveniences.

Figure 8:
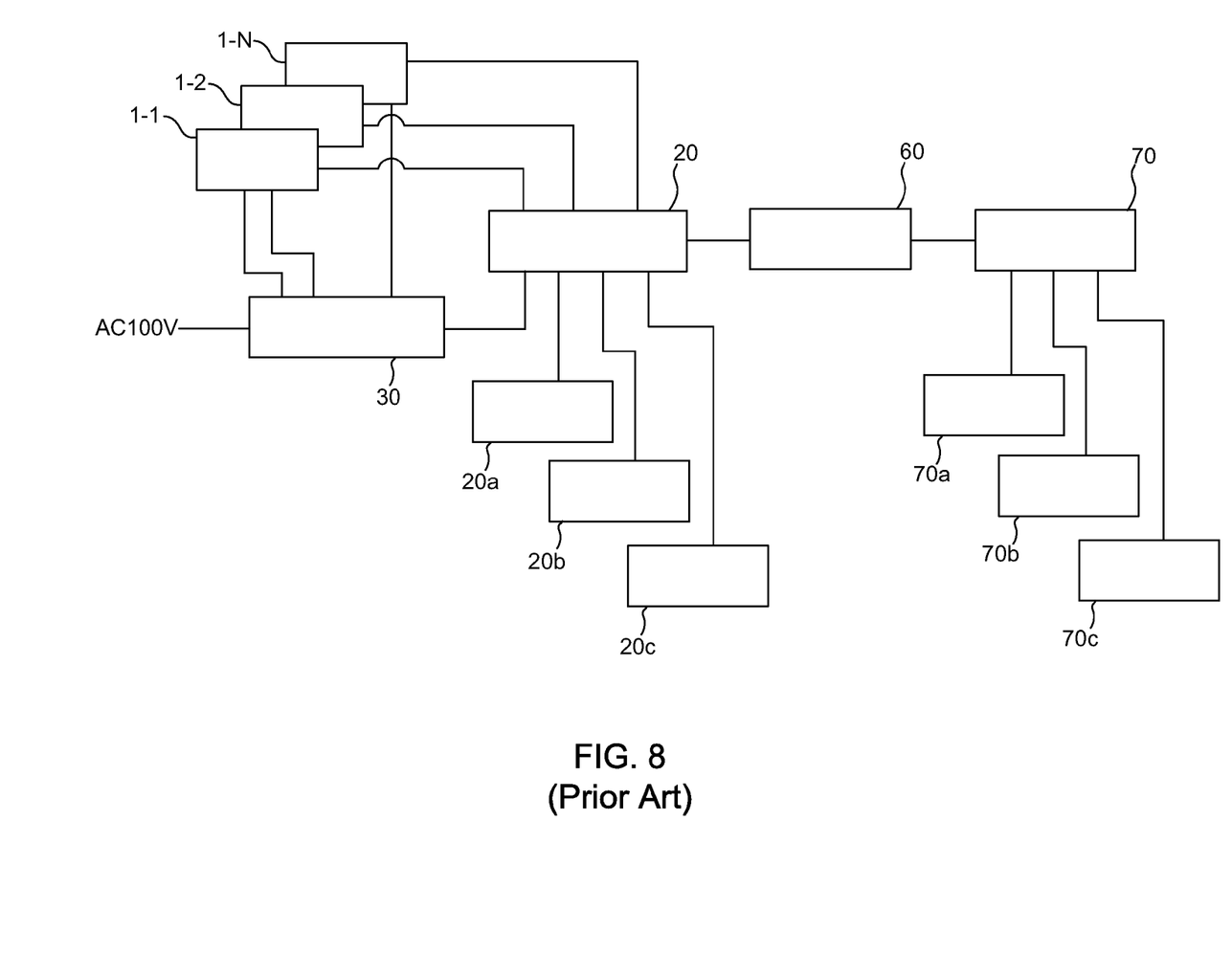
FIG. 8 is a framework view of a KVM device having network-communication function.

Besides, please refer to FIG. 8, there is shown a framework view of a KVM device having network-communication function. The KVM device shown in FIG. 8 is introduced by an U.S. Pat. No. 8,078,917. As shown in FIG. 8, KVM switch 20 is connected to computer 70, and the computer 70 includes a keyboard 70a, a mouse 70b and a display 70c. The KVM switch 20 also includes a keyboard 20a, a mouse 20b and a display 20c and connects with a plurality of servers (1-1, 1-2, . . . , 1-N). The KVM switch 20 in FIG. 8 gets power from a power regulator 30. In this KVM framework, computer 70 is a command center and user can control the KVM switch 20 via the computer 70 to switch the connection between the servers (1-1, 1-2, . . . , 1-N) and KVM switch 20; This KVM device and framework is so-called KVMoIP. The similar KVMoIP framework are also introduced in other U.S. patents, such as U.S. Pat. Nos. 7,478,182, 7,428,606 and 6,378,009.

However, whatever the KVM devices and the KVM frameworks proposed by the U.S. Pat. No. 8,078,917, the U.S. Pat. No. 7,478,182, the U.S. Pat. No. 7,428,606, or the U.S. Pat. No. 6,378,009, all the (host) computers in the KVM frameworks are connected to the KVM switches by using "network", and it means that the computers could not connect to the KVM switch if the computers lack the ethernet connectors (i.e., RJ45 connectors). So that, if the connection way between the computer and the KVM switch can be modified from network interface to plug-and-play interface, that may be a friendly connection interface.

Accordingly, in view of the conventional network communication system and KVMoIP still have shortcomings and drawbacks, the inventor of the present application has made great efforts to make inventive research thereon and eventually provided a multi-computers network sharing system having plug-and-play interfaces.

BRIEF SUMMARY OF THE INVENTION

The primary objective of the present invention is to provide a multi-computers network sharing system having plug-and-play interfaces for transforming the ethernet signal of an ethernet network to a plug-and-play interface signal, so as to facilitate the electronic devices connected to the multi-computers network sharing system capable of connecting to the Internet, without using any network cables or wi-fi devices.

Accordingly, to achieve the above objectives of the present invention, the inventor proposes a multi-computers network sharing system having plug-and-play interfaces, comprising:

a first ethernet physical unit, used for communicating with an ethernet network;

a first media accessing and controlling unit, coupled to the first ethernet physical unit in order to control the first ethernet physical unit for accessing an ethernet signal of the ethernet network;

a flow control unit, coupled to the first media accessing and controlling unit;

a plug-and-play interface transforming module, coupled to the flow control unit; and a plurality of plug-and-play interfaces, coupled to the plug-and-play interface transforming module and used for respectively connecting a plurality of external electronic devices;

wherein when one of the external electronic devices is connected to any one of the plug-and-play interfaces, the flow control unit transmitting the ethernet signal accessed by the first media accessing and controlling unit to the plug-and-play interface transforming module, therefore the plug-and-play interface transforming module transforms the ethernet signal to a plug-and-play interface signal and next transmits the plug-and-play interface signal to the electronic device connected with the plug-and-play interface, such that the electronic device can connect to the Internet.

Moreover, in order to achieve the above objectives of the present invention, the inventor proposes a second embodiment for the multi-computers network sharing system having plug-and-play interfaces, comprising:

an ethernet physical unit, used for communicating with an ethernet network;

a media accessing and controlling unit, coupled to the ethernet physical unit in order to control the ethernet physical unit for accessing an ethernet signal of the ethernet network;

a flow control unit, coupled to the media accessing and controlling unit;

a plurality of plug-and-play interface core units, coupled to the flow control unit; and a plurality of plug-and-play interfaces, coupled to the plug-and-play interface core units and used for connecting a plurality of external electronic devices, respectively;

wherein when one of the external electronic devices is connected to any one of the plug-and-play interfaces, the related plug-and-play interface core unit would drive the plug-and-play interface; therefore the flow control unit transmits the ethernet signal accessed by the media accessing and controlling unit to the plug-and-play interface core unit; and then the plug-and-play interface core unit transforms the ethernet signal to a plug-and-play interface signal and next transmits the plug-and-play interface signal to the electronic device connected with the plug-and-play interface, such that the electronic device can connect to the Internet.

Furthermore, for achieving the above objectives of the present invention, the inventor proposes a third embodiment for the multi-computers network sharing system having plug-and-play interfaces, comprising:

a first ethernet physical unit, used for communicating with an ethernet network;

a first media accessing and controlling unit, coupled to the first ethernet physical unit in order to control the first ethernet physical unit for accessing an ethernet signal of the ethernet network;

a flow control unit, coupled to the first media accessing and controlling unit;

a plurality of second media accessing and controlling units, coupled to the flow control unit;

a plurality of third media accessing and controlling units, coupled to the second media accessing and controlling units, respectively;

a plurality of plug-and-play interface core units, coupled to the third media accessing and controlling units, respectively; and a plurality of plug-and-play interfaces, coupled to the plug-and-play interface core units and used for connecting a plurality of external electronic devices, respectively;

wherein when one of the external electronic devices is connected to any one of the plug-and-play interfaces, the related plug-and-play interface core unit would drive the plug-and-play interface; therefore the flow control unit transmits the ethernet signal accessed by the first media accessing and controlling unit to the plug-and-play interface core unit through the third media accessing and controlling unit and the second media accessing and controlling unit; and then the plug-and-play interface core unit transforms the ethernet signal to a plug-and-play interface signal and next transmits the plug-and-play interface signal to the electronic device connected with the plurality of plug-and-play interface, such that the electronic device can connect to the Internet.

BRIEF DESCRIPTION OF THE SEVERAL VIEWS OF THE DRAWINGS

The invention as well as a preferred mode of use and advantages thereof will be best understood by referring to the following detailed description of an illustrative embodiment in conjunction with the accompanying drawings, wherein.

DETAILED DESCRIPTION OF THE INVENTION

To more clearly describe a multi-computers network sharing system having plug-and-play interfaces according to the present invention, embodiments of the present invention will be described in detail with reference to the attached drawings hereinafter.

Figure 2:
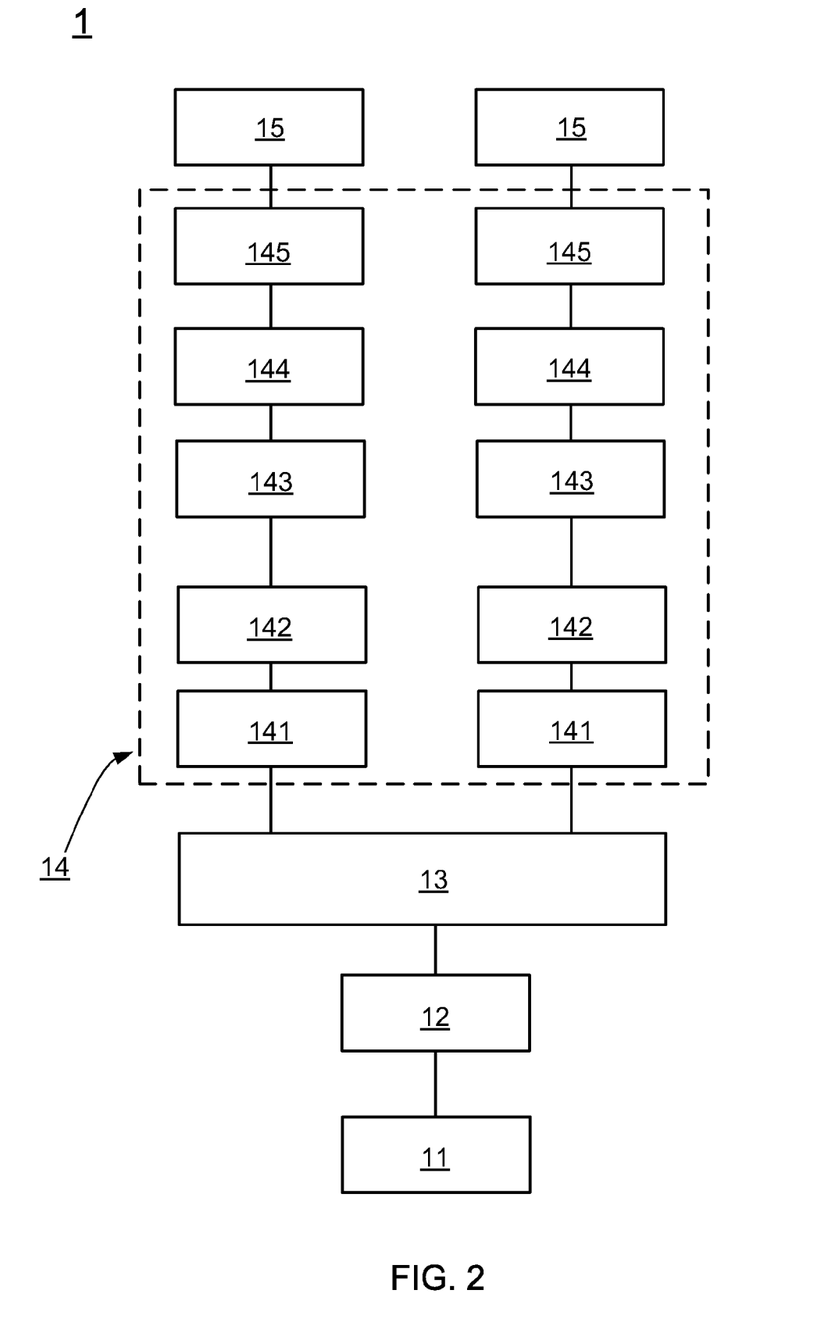
FIG. 2 is a framework view of a multi-computers network sharing system having plug-and-play interfaces according to the present invention.
Figure 3:
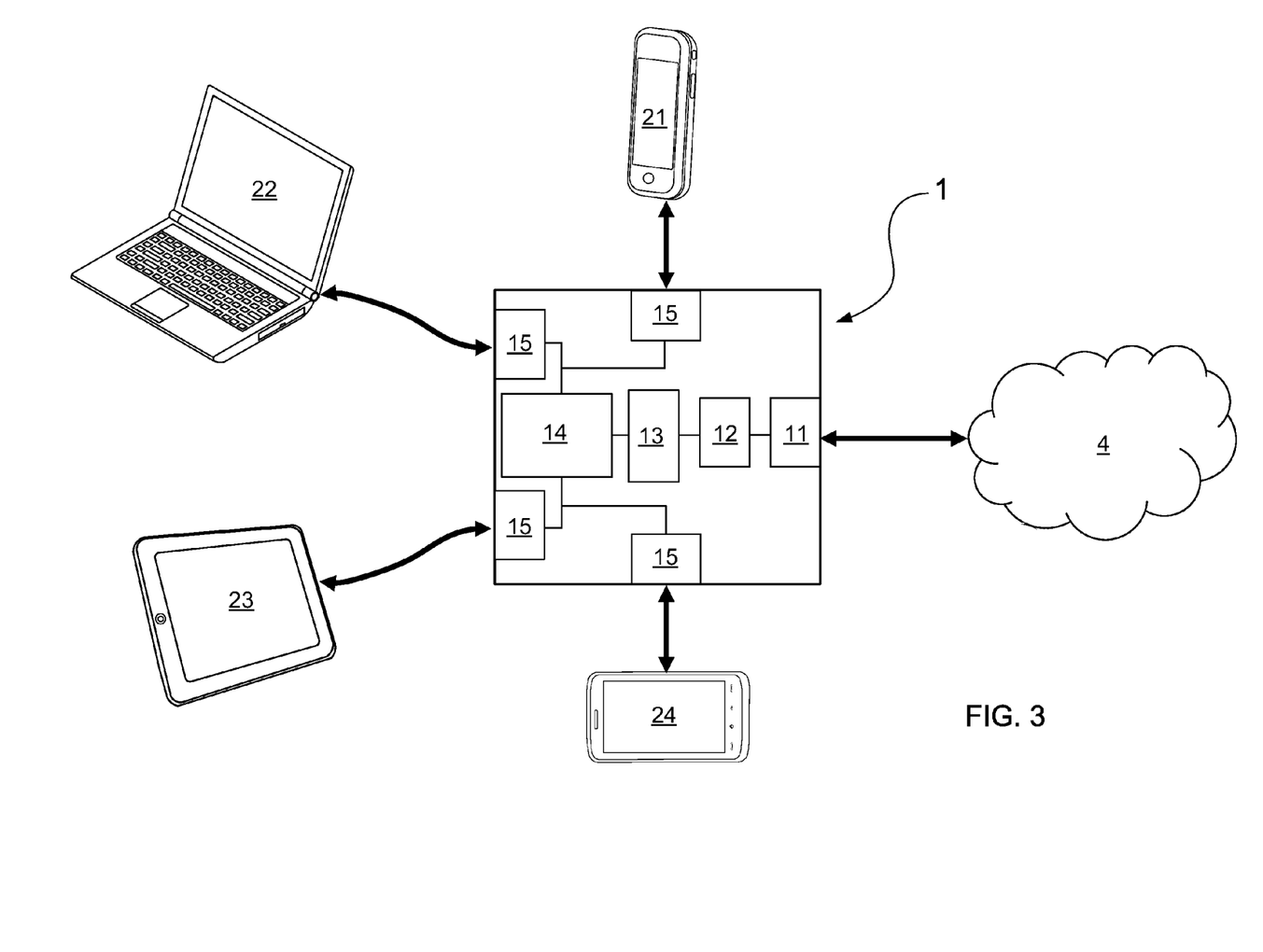
FIG. 3 is a schematic application diagram of the multi-computers network sharing system having plug-and-play interfaces.

Please refer to FIG. 2, which illustrates a framework view of a multi-computers network sharing system having plug-and-play interfaces according to the present invention, and please simultaneously refer to FIG. 3, which illustrates a schematic application diagram of the multi-computers network sharing system having plug-and-play interfaces. As shown in FIG. 2, the multi-computers network sharing system 1 having plug-and-play interfaces mainly includes: a first ethernet physical unit 11, a first media accessing and controlling unit 12, a flow control unit 13, a plug-and-play interface transforming module 14, and a plurality of plug-and-play interfaces 15 (FIG. 2 merely shows two plug-and-play interfaces 15). The first ethernet physical unit 11 is used for communicating with an ethernet network 4, and the first media accessing and controlling unit 12 is coupled to the first ethernet physical unit 11 in order to control the first ethernet physical unit 11 for accessing an ethernet signal of the ethernet network 4.

Inheriting to above instruction for this multi-computers network sharing system 1, the flow control unit 13 is coupled to the first media accessing and controlling unit 12, and plug-and-play interface transforming module 14 is coupled to the flow control unit 13. Moreover, the plug-and-play interfaces 15 are coupled to the plug-and-play interface transforming module 14 and used for respectively connecting a plurality of external electronic devices. In the multi-computers network sharing system 1 of the present invention, when one of the external electronic devices is connected to any one of the plug-and-play interfaces 15, the flow control unit 13 would transmit the ethernet signal accessed by the first media accessing and controlling unit 12 to the plug-and-play interface transforming module 14, therefore the plug-and-play interface transforming module 14 transforms the ethernet signal to a plug-and-play interface signal and next transmits the plug-and-play interface signal to the electronic device connected with the plug-and-play interface 15, such that the electronic device can connect to the Internet (i.e., the ethernet network 4).

So that, the basic framework and the elementary units of the multi-computers network sharing system 1 having plug-and-play interfaces has been introduced through aforesaid descriptions. Next, the detailed constituting units of the multi-computers network sharing system 1 will be further introduced in follows. As shown in FIG. 2, the plug-and-play interface transforming module 14 of the multi-computers network sharing system 1 includes: a plurality of second media accessing and controlling units 141, a plurality of second ethernet physical units 142, a plurality of third ethernet physical units 143, a plurality of third media accessing and controlling units 144, and a plurality of plug-and-play interface core units 145. In FIG. 2, it merely shows two second media accessing and controlling units 141, two second ethernet physical units 142, two third ethernet physical units 143, two third media accessing and controlling units 144, and two plug-and-play interface core units 145.

Inheriting to above instruction for the plug-and-play interface transforming module 14 of the multi-computers network sharing system 1, the second media accessing and controlling units 141 are coupled to the flow control unit 13 for receiving the ethernet signal, and the second ethernet physical units 142 are coupled to the second media accessing and controlling units 141, respectively. As shown in FIG. 2, the third ethernet physical units 143 are respectively coupled to the second ethernet physical units 142, and the third media accessing and controlling units 144 are coupled to third ethernet physical units 143, respectively. Moreover, the plug-and-play interface core units 145 are coupled to the third media accessing and controlling units 144 for transmitting the ethernet signal to the external electronic device connected to the plug-and-play interface 15 through the format of the plug-and-play interface signal.

Through the FIG. 3, it should further understand the functions provided by the multi-computers network sharing system 1 having plug-and-play interfaces of the present invention. As shown in FIG. 3, an Apple® smart phone 21, a notebook 22, an Apple® tablet PC 23, and an HTC® smart phone 24 are simultaneously connected to the multi-computers network sharing system 1 having plug-and-play interfaces, wherein the first ethernet physical unit 11 of the multi-computers network sharing system 1 is connected to an ethernet network 4. So that, the Apple® smart phone 21, the notebook 22, the Apple® tablet PC 23, and the HTC® smart phone 24 can connect to the Internet (i.e., the ethernet network 4) via the multi-computers network sharing system 1.

Continuously referring to FIG. 3, the plug-and-play interface 15 of the multi-computers network sharing system 1 connected to the Apple® smart phone 21 is a thunderbolt interface because the new Apple® smart phone 21 uses thunderbolt connector as the signal-transmitting interface thereof; of course, the signal transmitted between the thunderbolt connector of the Apple® smart phone 21 and the plug-and-play interface 15 of the multi-computers network sharing system 1 is thunderbolt signal. On the other hand, since the notebook 22 usually adopts USB connector as the signal-transmitting interface thereof, it is able to know that the plug-and-play interface 15 of the multi-computers network sharing system 1 connected to the notebook 22 is an USB interface, and the signal transmitted between the thunderbolt connector of the notebook 22 and the plug-and-play interface 15 of the multi-computers network sharing system 1 is USB signal.

Inheriting to above description, the plug-and-play interface 15 of the multi-computers network sharing system 1 connected to the Apple® tablet PC 23 is a dock connector interface because the Apple® tablet PC 23 uses dock connector as the signal-transmitting interface thereof; of course, the signal transmitted between the dock connector of the Apple® tablet PC 23 and the plug-and-play interface 15 of the multi-computers network sharing system 1 is dock connector signal.

Moreover, for the HTC® smart phone 24 usually adopts mini USB connector as the signal-transmitting interface thereof, it is able to know that the plug-and-play interface 15 of the multi-computers network sharing system 1 connected to the HTC® smart phone 24 is a mini USB interface, and the signal transmitted between the thunderbolt connector of the HTC® smart phone 24 and the plug-and-play interface 15 of the multi-computers network sharing system 1 is mini USB signal. Herein it needs to especially explain that, in spite of 1394 interface is rarely used in conventional 3C electronic devices, the plug-and-play interface 15 can also be the 1394 interface.

Thus, through aforesaid instructions and related descriptions, it is able to clearly know that the main function of the multi-computers network sharing system 1 having plug-and-play interfaces is to provide those electronic devices connected to the multi-computers network sharing system 1 to communicate with the Internet (i.e., the ethernet network 4) via plug-and-play (PNP) interfaces, without using any network cables or wi-fi devices. Furthermore, not merely being a PNP interface-to-Ethernet switch, the multi-computers network sharing system 1 having plug-and-play interfaces can be made to a chip for adapting to be embedded into an USB KVM device or a docking station, such that the external electronic devices connected to the USB KVM device or the docking station are capable of connecting to the Internet.

Figure 4:
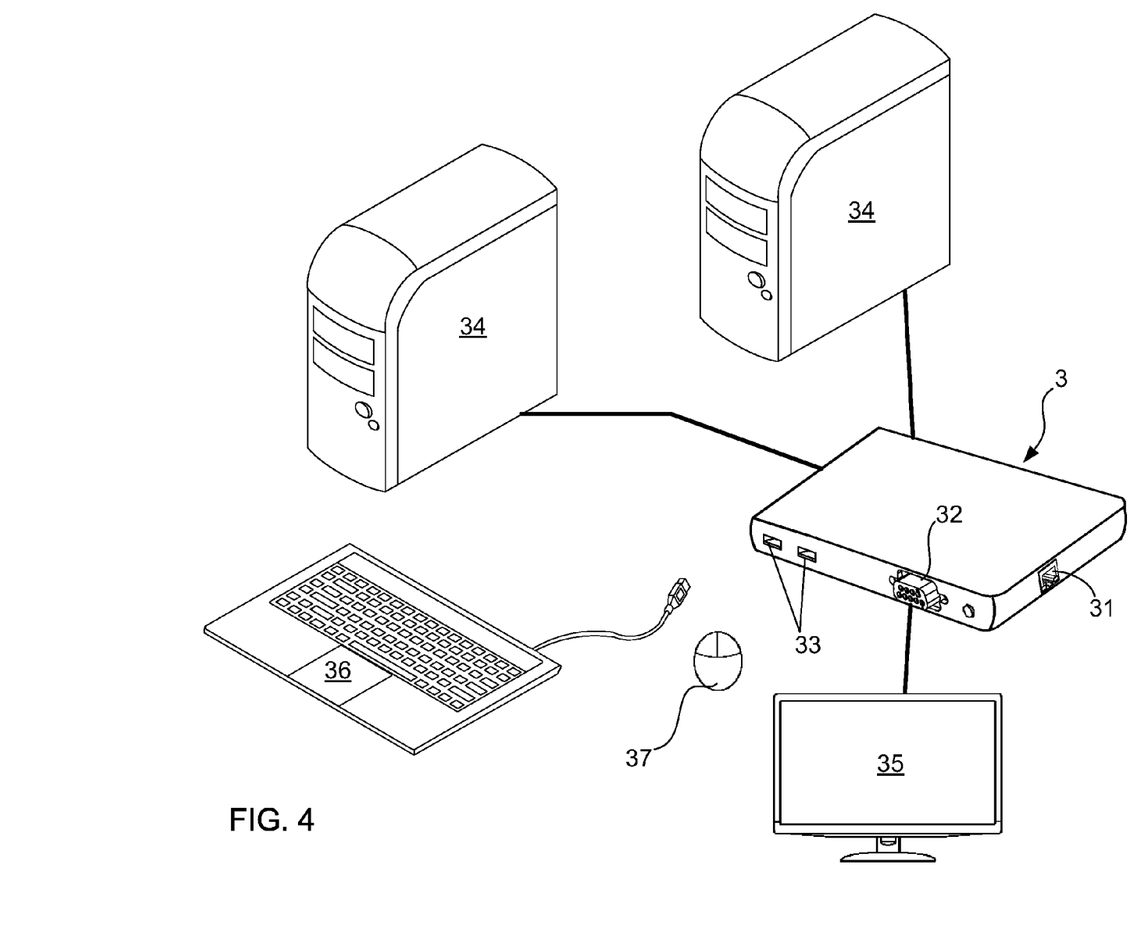
FIG. 4 is a stereo view of an USB KVM device embedded with the multi-computers network sharing system having plug-and-play interfaces.

Please refer to FIG. 4, there is shown a stereo view of an USB KVM device embedded with the multi-computers network sharing system having plug-and-play interfaces. As shown in FIG. 4, the USB KVM device 3 embedded with the multi-computers network sharing system 1 includes a plurality of USB interfaces 33, at lease one video interface 32 and an ethernet connector 31, in which two computers 34, a keyboard 36 and a mouse 37 are connected to the USB KVM device 3 via the USB interfaces 33 and a display 35 is connected to the USB KVM device 3 through the video interface 32. So that, through aforesaid connection way, it is able to dominate any one of two computers 34 via the switch of the USB KVM device 3, and the dominated computer 34 can connect to the Internet (i.e., the ethernet network 4) through the multi-computers network sharing system 1 embedded within the USB KVM device 3.

Figure 5:
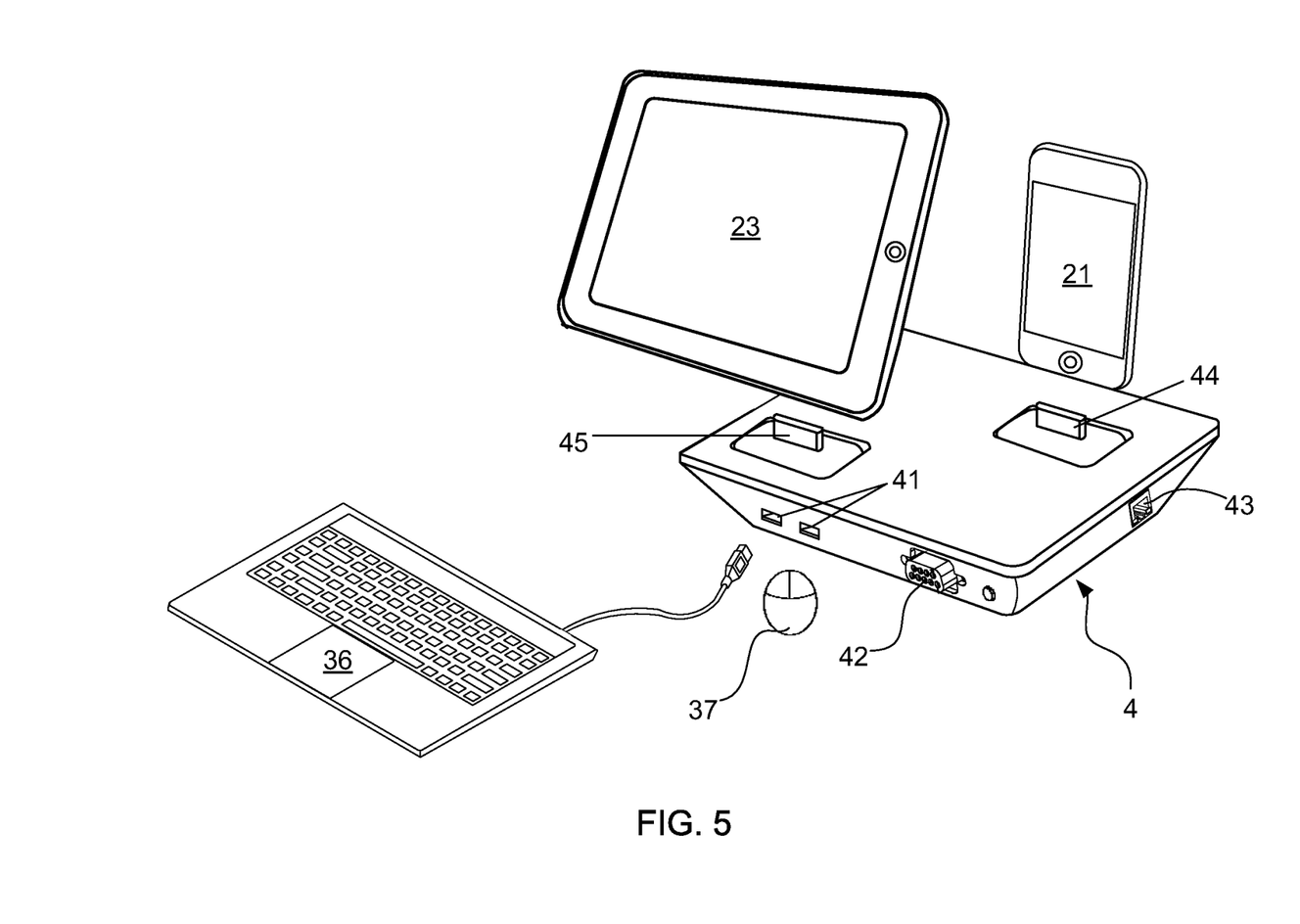
FIG. 5 is a stereo view of a docking station embedded with the multi-computers network sharing system having plug-and-play interfaces.

Please refer to FIG. 5, there is shown a stereo view of a docking station embedded with the multi-computers network sharing system having plug-and-play interfaces. As shown in FIG. 5, the docking station 4 embedded with the multi-computers network sharing system 1 includes a plurality of USB interfaces 41, at least one video interface 42, an ethernet connector 43, a thunderbolt interface 44, and a docking connector interface 45, in which the keyboard 36 and the mouse 37 are connected to the USB interfaces 41. The owner of the Apple® smart phone 21 and the Apple® tablet PC 23 would generally purchase a docking station 4, and put the docking station 4 on the table for simultaneously supporting the Apple® smart phone 21 and the Apple® tablet PC 23. As shown in FIG. 5, the Apple® smart phone 21 and the Apple® tablet PC 23 are connected to the docking station 4 via the thunderbolt interface 44 and dock connector interface, respectively. So that, the Apple® smart phone 21 and the Apple® tablet PC 23 disposed on the docking station 4 can merely be charged, but they can also connect to the Internet (i.e., the ethernet network 4) through the multi-computers network sharing system 1 embedded within the docking station 4.

Figure 6:
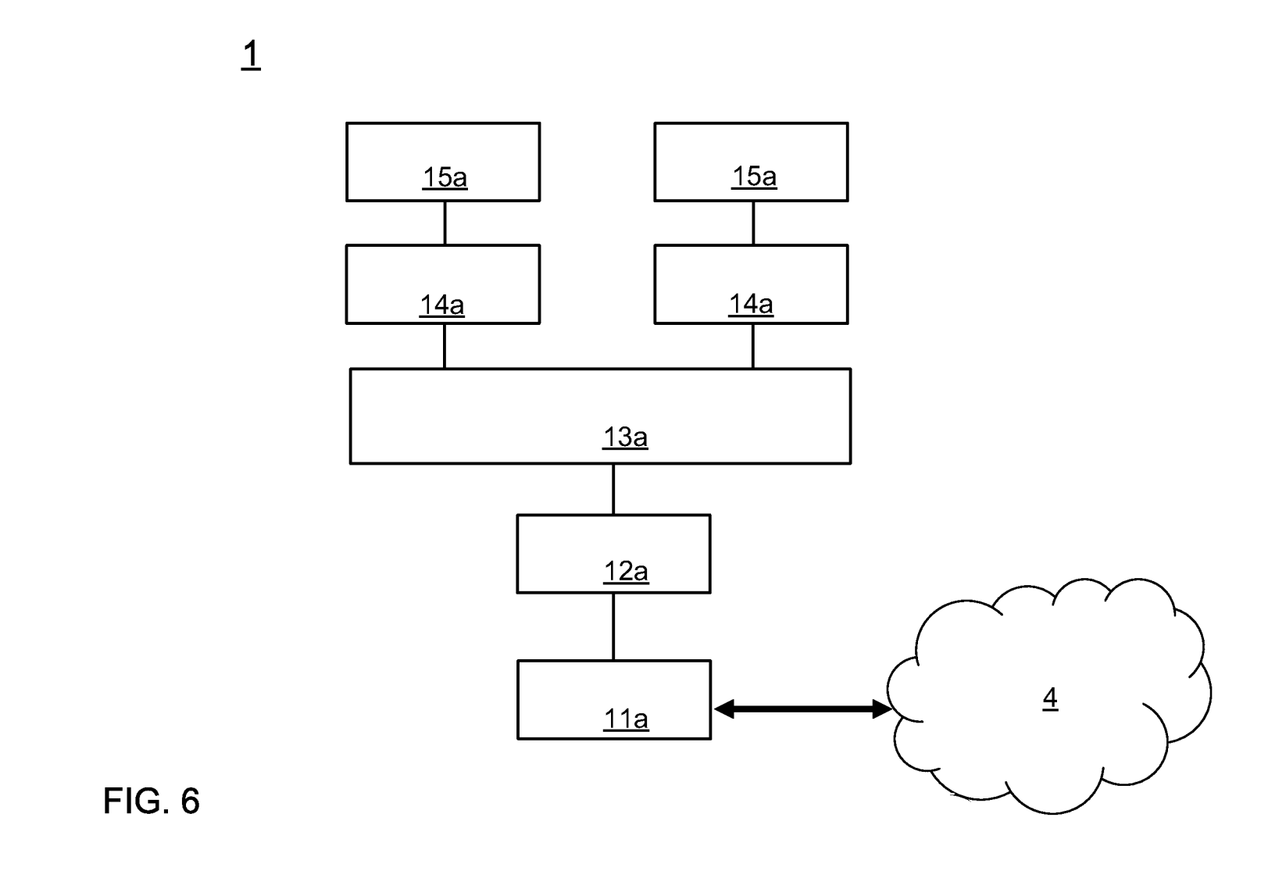
FIG. 6 is a framework view of a second embodiment of the multi-computers network sharing system having plug-and-play interfaces according to the present invention.

Therefore, the framework, constituting elements and units and the related applications of the multi-computers network sharing system 1 having plug-and-play interfaces of the present invention have been clearly introduce and describe through the supplementation of various figures and drawings. In addition to the aforesaid embodiment, the present invention further induces a second embodiment for the multi-computers network sharing system having plug-and-play interfaces. Please refer to FIG. 6, which illustrates a framework view of a second embodiment of the multi-computers network sharing system having plug-and-play interfaces according to the present invention. As shown in FIG. 6, the second embodiment of the multi-computers network sharing system 1 includes: an ethernet physical unit 11a, a media accessing and controlling unit 12a, a flow control unit 13a, a plurality of plug-and-play interface core units 14a, and a plurality of plug-and-play interfaces 15a, wherein FIG. 6 only schematically shows two plug-and-play interface core units 14a and plug-and-play interfaces 15a.

In the second embodiment, the ethernet physical unit 11a is used for communicating with an ethernet network 4, and the media accessing and controlling unit 12a is coupled to the ethernet physical unit 11a in order to control the ethernet physical unit 11a for accessing an ethernet signal of the ethernet network 4. Moreover, the flow control unit 13a is coupled to the media accessing and controlling unit 12a, and the plug-and-play interface core units 14a are coupled to the flow control unit 13a. And the plug-and-play interfaces 15a are coupled to the plug-and-play interface core units 14a and used for connecting a plurality of external electronic devices, respectively.

In the second embodiment of the multi-computers network sharing system 1 having plug-and-play interfaces, when one of the external electronic devices is connected to any one of the plug-and-play interfaces 15a, the related plug-and-play interface core unit 14a would drive the plug-and-play interface 15a; therefore the flow control unit 13a transmits the ethernet signal accessed by the media accessing and controlling unit 12a to the plug-and-play interface core unit 14a; and then the plug-and-play interface core unit 14a transforms the ethernet signal to a plug-and-play interface signal and next transmits the plug-and-play interface signal to the electronic device connected with the plug-and-play interface 15a, such that the electronic device can connect to the Internet.

Moreover, the same to the aforesaid embodiment, the plug-and-play interface 15a in the second embodiment of the multi-computers network sharing system 1 can be USB interface, 1394 interface, thunderbolt interface, or dock connector interface, and the related transmission signals are USB signal, 1394 signal, thunderbolt signal, and dock connector signal, respectively. Moreover, the second embodiment of the multi-computers network sharing system 1 can also be made to a chip for adapting to be embedded into an USB KVM device or a docking station, such that the electronic devices connected to the USB KVM device or the docking station king station are capable of connecting to the Internet.

Figure 7:
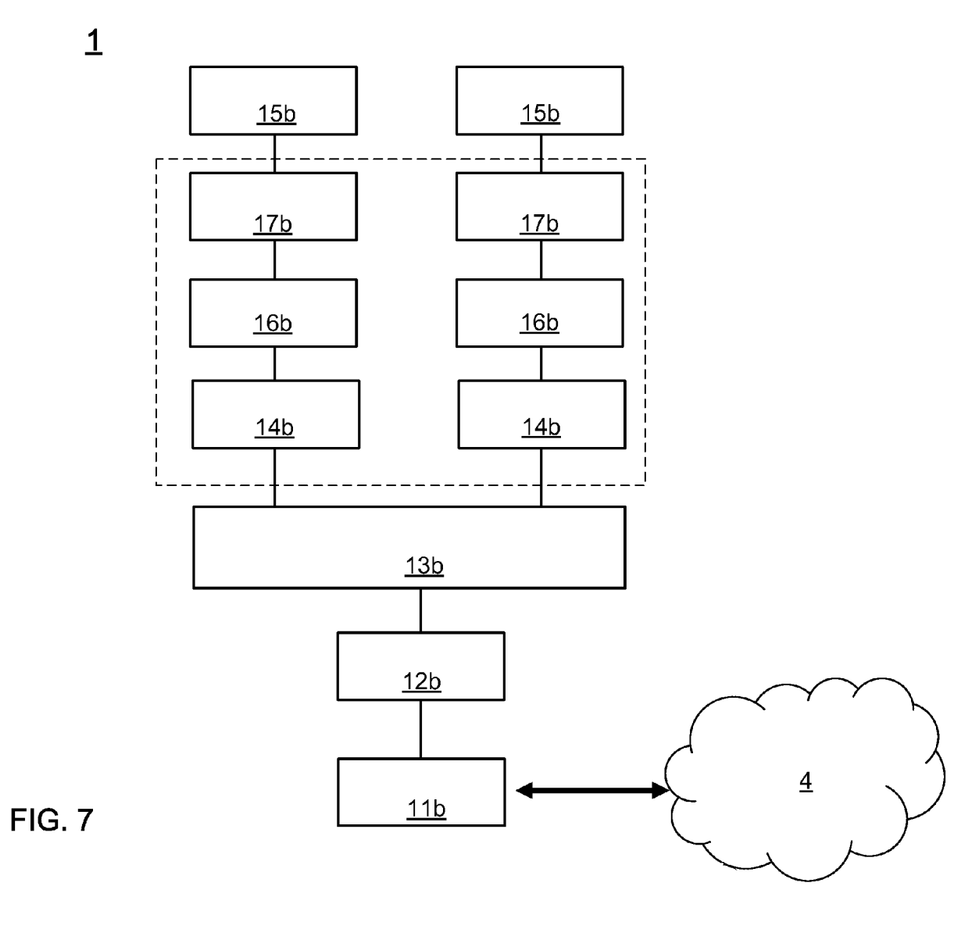
FIG. 7 is a framework view of a third embodiment of the multi-computers network sharing system having plug-and-play interfaces according to the present invention.

Besides the aforesaid embodiments, the present invention further induces a third embodiment for the multi-computers network sharing system having plug-and-play interfaces. Please refer to FIG. 7, which illustrates a framework view of a third embodiment of the multi-computers network sharing system having plug-and-play interfaces according to the present invention. As shown in FIG. 7, the third embodiment of the multi-computers network sharing system 1 includes: a first ethernet physical unit 11b, a first media accessing and controlling unit 12b, a flow control unit 13b, a plurality of second media accessing and controlling units 14b, a plurality of third media accessing and controlling units 16b, a plurality of plug-and-play interface core units 17b, and a plurality of plug-and-play interfaces 15b, in which FIG. 7 merely schematically shows two second media accessing and controlling units 14b, two third media accessing and controlling units 16b, two plug-and-play interface core units 17b, and two plug-and-play interfaces 15b.

As shown in FIG. 7, the first ethernet physical unit 11b is used for communicating with an ethernet network 4, and the first media accessing and controlling unit 12b is coupled to the first ethernet physical unit 11b in order to control the first ethernet physical unit 11b for accessing an ethernet signal of the ethernet network 4. In addition, the flow control unit 13b is coupled to the first media accessing and controlling unit 12b, and the second media accessing and controlling units 14b is coupled to the flow control unit 13b. Moreover, the third media accessing and controlling units 16b are respectively coupled to the second media accessing and controlling units 14b, and the plug-and-play interface core units 17b are coupled to the third media accessing and controlling units 16b, respectively. And the plug-and-play interfaces 15b are coupled to the plug-and-play interface core units 17b and used for respectively connecting a plurality of external electronic devices.

In the third embodiment of this multi-computers network sharing system 1, when one of the external electronic devices is connected to any one of the plug-and-play interfaces 15b, the related plug-and-play interface core unit 17b would drive the plug-and-play interface 15b; therefore the flow control unit 13 transmits the ethernet signal accessed by the first media accessing and controlling unit 12 to the plug-and-play interface core unit 17b through the third media accessing and controlling unit 16b and the second media accessing and controlling unit 14b; and then the plug-and-play interface core unit 17b transforms the ethernet signal to a plug-and-play interface signal and next transmits the plug-and-play interface signal to the electronic device connected with the plurality of plug-and-play interface 15b, such that the electronic device can connect to the Internet.

The same to the aforesaid embodiments, the plug-and-play interface 15b in the third embodiment of the multi-computers network sharing system 1 can be USB interface, 1394 interface, thunderbolt interface, dock connector interface, or mini USB interface, and the related transmission signals are USB signal, 1394 signal, thunderbolt signal, dock connector signal, and mini USB signal, respectively. Moreover, the third embodiment of the multi-computers network sharing system 1 can also be made to a chip for adapting to be embedded into an USB KVM device or a docking station, such that the electronic devices connected to the USB KVM device or the docking station king station are capable of connecting to the Internet. Furthermore, it needs to especially explain that, for the third embodiment of the multi-computers network sharing system 1 having plug-and-play interfaces, to integrated the second media accessing and controlling units 14b, the third media accessing and controlling units 16b and the plug-and-play interface core units 17b to be a chip is possible.

Therefore, the above descriptions have been clearly and completely introduced the multi-computers network sharing system having plug-and-play interfaces of the present invention; in summary, the present invention has the following advantages:

1. Comparing to the conventional network communication system with an ethernet interface and an USB interface, the multi-computers network sharing system having plug-and-play interfaces proposed by the present invention can not only transform the ethernet signal of the ethernet network to the plug-and-play interface signal, but also provide those electronic devices connected to the multi-computers network sharing system 1 to communicate with the Internet (i.e., the ethernet network) via plug-and-play (PNP) interfaces, without using any network cables or wi-fi devices.

2. Inheriting to above description, moreover, the multi-computers network sharing system having plug-and-play interfaces proposed by the present invention can be made to a chip for adapting to be embedded into an USB KVM device or a docking station, such that the external electronic devices connected to the USB KVM device or the docking station are capable of connecting to the Internet.

The above description is made on embodiments of the present invention. However, the embodiments are not intended to limit scope of the present invention, and all equivalent implementations or alterations within the spirit of the present invention still fall within the scope of the present invention.

I claim:

1. A multi-computers network sharing system having plug-and-play interfaces, comprising:
   a first ethernet physical unit, being used for communicating with an ethernet network;
   a first media accessing and controlling unit, being coupled to the first ethernet physical unit in order to control the first ethernet physical unit for accessing an ethernet signal of the ethernet network;
   a flow control unit, being coupled to the first media accessing and controlling unit;
   a plug-and-play interface transforming module, being coupled to the flow control unit; and
   a plurality of plug-and-play interfaces, being coupled to the plug-and-play interface transforming module and used for respectively connecting a plurality of external electronic devices;
   wherein the plug-and-play interface is selected from the group consisting of: USB interface, 1394 interface, thunderbolt interface, and dock connector interface;
   wherein when one of the external electronic devices is connected to any one of the plug-and-play interfaces, the flow control unit transmitting the ethernet signal accessed by the first media accessing and controlling unit to the plug-and-play interface transforming module, therefore the plug-and-play interface transforming module transforms the ethernet signal to a plug-and-play interface signal and next transmits the plug-and-play interface signal to the electronic device connected with the plug-and-play interface, such that the electronic device can connect to the Internet.

2. The multi-computers network sharing system having plug-and-play interfaces as described in claim 1, wherein the plug-and-play interface transforming module further comprises:
   a plurality of second media accessing and controlling units, being coupled to the flow control unit for receiving the ethernet signal;
   a plurality of second ethernet physical units, being respectively coupled to the second media accessing and controlling units;
   a plurality of third ethernet physical units, being respectively coupled to the second ethernet physical units;
   a plurality of third media accessing and controlling units, being respectively coupled to third ethernet physical units; and
   a plurality of plug-and-play interface core units, being coupled to the third media accessing and controlling units, used for transmitting the ethernet signal to the external electronic device connected to the plug-and-play interface through the format of the plug-and-play interface signal.

3. The multi-computers network sharing system having plug-and-play interfaces as described in claim 1, wherein the plug-and-play interface signal is selected from the group consisting of: USB signal, 1394 signal, thunderbolt signal, and dock connector signal.

4. The multi-computers network sharing system having plug-and-play interfaces as described in claim 1, which can be made to a chip for adapting to be embedded into an USB KVM device, and then the external electronic device connected to the USB KVM device is capable of connecting to the Internet.

5. The multi-computers network sharing system having plug-and-play interfaces as described in claim 1, which can be made to a chip for adapting to be embedded into a docking station, and then the electronic device disposed on the docking station is capable of connecting to the Internet.

6. A multi-computers network sharing system having plug-and-play interfaces, comprising:
   an ethernet physical unit, being used for communicating with an ethernet network;
   a media accessing and controlling unit, being coupled to the ethernet physical unit in order to control the ethernet physical unit for accessing an ethernet signal of the ethernet network;
   a flow control unit, being coupled to the media accessing and controlling unit;
   a plurality of plug-and-play interface core units, being coupled to the flow control unit; and
   a plurality of plug-and-play interfaces, being coupled to the plug-and-play interface core units and used for connecting a plurality of external electronic devices, respectively;
   wherein the plug-and-play interface is selected from the group consisting of: USB interface, 1394 interface, thunderbolt interface, and dock connector interface;
   wherein when one of the external electronic devices is connected to any one of the plug-and-play interfaces, the related plug-and-play interface core unit would drive the plug-and-play interface; therefore the flow control unit transmits the ethernet signal accessed by the media accessing and controlling unit to the plug-and-play interface core unit; and then the plug-and-play interface core unit transforms the ethernet signal to a plug-and-play interface signal and next transmits the plug-and-play interface signal to the electronic device connected with the plug-and-play interface, such that the electronic device can connect to the Internet.

7. The multi-computers network sharing system having plug-and-play interfaces as described in claim 6, wherein the plug-and-play interface signal is selected from the group consisting of: USB signal, 1394 signal, thunderbolt signal, and dock connector signal.

8. The multi-computers network sharing system having plug-and-play interfaces as described in claim 6, which can be made to a chip for adapting to be embedded into an USB KVM device, and then the external electronic device connected to the USB KVM device is capable of connecting to the Internet.

9. The multi-computers network sharing system having plug-and-play interfaces as described in claim 6, which can be made to a chip for adapting to be embedded into a docking station, and then the electronic device disposed on the docking station is capable of connecting to the Internet.

10. A multi-computers network sharing system having plug-and-play interfaces, comprising:
    a first ethernet physical unit, being used for communicating with an ethernet network;

a first media accessing and controlling unit, being coupled to the first ethernet physical unit in order to control the first ethernet physical unit for accessing an ethernet signal of the ethernet network;

a flow control unit, being coupled to the first media accessing and controlling unit;

a plurality of second media accessing and controlling units, being coupled to the flow control unit;

a plurality of third media accessing and controlling units, being respectively coupled to the second media accessing and controlling units;

a plurality of plug-and-play interface core units, being respectively coupled to the third media accessing and controlling units; and a plurality of plug-and-play interfaces, being coupled to the plug-and-play interface core units and used for connecting a plurality of external electronic devices, respectively;

wherein when one of the external electronic devices is connected to any one of the plug-and-play interfaces, the related plug-and-play interface core unit would drive the plug-and-play interface; therefore the flow control unit transmits the ethernet signal accessed by the first media accessing and controlling unit to the plug-and-play interface core unit through the third media accessing and controlling unit and the second media accessing and controlling unit; and then the plug-and-play interface core unit transforms the ethernet signal to a plug-and-play interface signal and next transmits the plug-and-play interface signal to the electronic device connected with the plurality of plug-and-play interface, such that the electronic device can connect to the Internet.

11. The multi-computers network sharing system having plug-and-play interfaces as described in claim 10, wherein the plug-and-play interface is selected from the group consisting of: USB interface, 1394 interface, thunderbolt interface, and dock connector interface.

12. The multi-computers network sharing system having plug-and-play interfaces as described in claim 11, wherein the plug-and-play interface signal is selected from the group consisting of: USB signal, 1394 signal, thunderbolt signal, and dock connector signal.

13. The multi-computers network sharing system having plug-and-play interfaces as described in claim 10, which can be made to a chip for adapting to be embedded into an USB KVM device, and then the external electronic device connected to the USB KVM device is capable of connecting to the Internet.

14. The multi-computers network sharing system having plug-and-play interfaces as described in claim 10, which can be made to a chip for adapting to be embedded into a docking station, and then the electronic device disposed on the docking station is capable of connecting to the Internet.

* * * * *